US005270098A

United States Patent [19]

Priester et al.

[11] Patent Number: 5,270,098

[45] Date of Patent: Dec. 14, 1993

[54] LIGHTWEIGHT, FLEXIBLE WAFFLELINE INTERCONNECT STRUCTURE AND METHODS OF PRODUCING SAME

[75] Inventors: Joseph W. Priester, Palm Bay; Steven E. Wilson, Melbourne; Ralph D. DiStefano, Palm Bay; James A. Sanborn, Satellite Beach; Robert J. Guinn, Melbourne, all of Fla.

[73] Assignee: Harris Corporation, Melbourne, Fla.

[21] Appl. No.: 884,310

[22] Filed: May 11, 1992

Related U.S. Application Data

[62] Division of Ser. No. 566,118, Aug. 10, 1990, abandoned.

[51] Int. Cl.[5] .......... B32B 3/28

[52] U.S. Cl. .......... 428/167; 428/120; 428/163; 428/164; 428/172; 428/148; 428/178; 428/213; 428/209

[58] Field of Search .......... 428/172, 174, 167, 163, 428/164, 209, 120, 148, 212, 213, 192, 188, 178, 901

[56] References Cited

U.S. PATENT DOCUMENTS

| | | | |
|---|---|---|---|
| 1,377,501 | 5/1921 | Novotny | 264/226 |
| 1,986,637 | 1/1935 | L'Hollier | 18/61 |
| 2,248,811 | 7/1941 | Lotterman | 264/227 |
| 4,213,238 | 7/1980 | Gudorf | 264/225 |
| 4,656,722 | 4/1987 | Armstrong | 264/226 |
| 4,695,810 | 9/1987 | Heckaman et al. | 333/236 |
| 4,710,334 | 12/1987 | Rosetti | 264/225 |
| 4,758,399 | 7/1988 | Hamakawa | 264/227 |
| 4,772,864 | 9/1988 | Otto et al. | 333/238 |
| 4,851,793 | 7/1989 | Heckaman et al. | 333/243 |

*Primary Examiner*—Donald J. Loney
*Attorney, Agent, or Firm*—Charles E. Wands

[57] ABSTRACT

A method of making a thin, lightweight and flexible RF waffleline includes the production of a negative silicone casting from a relatively thick and rigid metal positive tooling plate having the identical matrix of the desired waffleline and product. The waffleline is formed by casting an epoxy resin on the silicone casting or nickel electroforming, following by metallization. The waffleline end products is either a very thin and flexible epoxy composite structure or a nickel electroform metallized with gold. Accordingly, a negative WMA image can now be cast, as opposed to expensive machining or forming, with relatively simple and inexpensive techniques in fabricating the process tooling.

18 Claims, 6 Drawing Sheets

LIGHTWEIGHT, FLEXIBLE WAFFLELINE INTERCONNECT STRUCTURE AND METHODS OF PRODUCING SAME

The U.S. Government has rights in the present invention under a proprietary Government Contract.

This is a division of application Ser. No. 566,118, filed Aug. 10, 1990, now abandoned.

BACKGROUND AND SUMMARY OF THE INVENTION

The present invention relates to a lightweight, flexible WAFFLELINE ® structure (WAFFLELINE is a registered trademark of Harris Corporation) and, more particularly, to a WAFFLELINE ® structure (WAFFLELINE is a registered trademark of Harris Corporation) having particular use as an RF interconnect structure which permits the inclusion of highly integrated RF/microwave functions into a structure having flat or curved surfaces such as may be found, for example, in the smart skin of aircraft fuselages. The present invention is also directed to the method of making such a lightweight, flexible WAFFLELINE structure using a silicone casting as a negative matrix, to reproduce the WAFFLELINE structure either with epoxy resin castings or electroformed nickel with 0° draft on the WAFFLELINE channel walls and with weight savings of 250% or more over conventional WAFFLELINE structures which have been machined.

Typically, a WAFFLELINE structure is fabricated from a machined metallic structure such as aluminum. As shown in U.S. Pat. No. 4,695,810, WAFFLELINE grid structures have been produced by machining or etching an aluminum plate. For example, a multi-blade circular saw mounted on a single arbor in an automatic feed milling machine cuts grooves in the aluminum plate to form parallel, spaced-apart channels through sequential cuts. After the grooves are cut in one direction, the plate is then rotated 90° for cutting other parallel, spaced-apart channels so as to define a matrix of substantially rectangular plate material therebetween.

Another technique which has been used is investment casting of the metal plate because it requires very little machining clean-up. All design features, including the shape, configuration and component mounting pockets, as well as the WAFFLELINE grid structure, can be formed simultaneously. Similarly, injection molding has been used to produce the grid structure.

The problem with the foregoing techniques of fabricating a WAFFLELINE structure is that they are relatively expensive processes. In addition, due to tolerance variations, it is not possible to produce identical WAFFLELINE structures when machine cutting is used. The conventional WAFFLELINE structure made from metal plate is also relatively thick and consequently undesirably heavy. Although the metal plate provides good heat transfer characteristics, its thickness and weight make it undesirable in many aerospace applications where space and weight are critical factors. This has become a significant disadvantage as WAFFLELINE structure details have become much smaller for high frequency applications and as it has become even more critical to maintain the geometries of the mesas and channels. Another disadvantage of conventional WAFFLELINE structures is that, because they are made of metal, they are inflexible. Thus, they cannot be conveniently used with different types of conformal surfaces, such as smart skin on aircraft fuselages.

It is an object of the present invention to overcome the problems and disadvantages associated with conventional WAFFLELINE structures and to provide a lightweight, flexible WAFFLELINE interconnect structure and method of producing same which allows the inclusion of highly integrated RF/microwave functions into a structure which is conformal with respect to curved surfaces and which can be fabricated from a cast composite structure or a nickel electroform structure.

In particular, it is an object of the present invention to provide a WAFFLELINE structure in which the weight is reduced on the order of two to three times the weight of machined structures with a relatively simple and inexpensive casting technique which uses a negative WAFFLELINE structure image made of a casting mixture such as silicone rubber, permits a 0° draft on WAFFLELINE structure channel walls and greatly simplifies the process of ejecting the finished WAFFLELINE structure from the negative WAFFLELINE structure image, yet provides outstanding resolution of the waffleline details.

The foregoing objects have been achieved in accordance with the present invention by producing an extremely lightweight resin casting or an electroformed nickel for the WAFFLELINE structure and utilizing a silicone negative mold in a casting process to form the very thin WAFFLELINE structure which also results unexpectedly in a flexible WAFFLELINE structure which can be used on non-flat surfaces. A first step in the process involves the machining of a tooling plate in the form of a relatively thick and rigid metal positive WAFFLELINE structure having the matrix details. A second step involves using the metal positive image onto which silicone is cast to form a negative mold with a silicone rubber. A composite epoxy resin can then be poured into the silicone mold in a mold assembly to form the WAFFLELINE structure a thin, flexible waffleline interconnect structure. Alternatively, instead of the second casting step using epoxy resin, nickel can be electroformed over the silicone mold in a known manner to produce the thin, flexible structure.

The present invention also contemplates that the epoxy resin can either be provided with a conductive filler which, of course, will add some weight or can be metallized so that it will conduct RF energy.

The advantages of the foregoing method and product are that the WAFFLELINE structure can be manufactured with an overall height less than 0.05 inches and a 0° draft angle. Although the WAFFLELINE structure can be made very thin and lightweight, it is also releasable from the silicone mold without a complicated ejection system. The 0° draft angle insures a proper wire restraint in the channels which also yields good RF transmission properties. The thin composite casting or nickel electroform represents a significant weight savings compared to the conventional metallic WAFFLELINE structure with the added advantage of flexibility for conformal surfaces.

A composite epoxy resin can be, for example, a two part resin such as EA 956 with Carbospheres for blackening the surface of the WAFFLELINE structure. This particular composite epoxy cures at room temperature which is also another advantage. It will be readily appreciated, however, that many other different types of composite epoxy resins can be used depending upon the particular application and the application requirements.

When a nickel electroform version is used, the electroform itself will be one to three mils thick. The nickel will be provided with a thin silver layer for conducting energy. Where epoxy is used to produce the WAFFLELINE structure for carrying wires, the structure can be made at least 50% lighter than machined aluminum and, in some instances, can be up to 300% lighter than a conventional machined aluminum WAFFLELINE. In addition, WAFFLELINE structures can now be matched with composite epoxy structures to which they are attached to permit bonding therebetween.

BRIEF DESCRIPTION OF THE DRAWINGS

These and other features, objects and advantages of the present invention will become more apparent from the following detailed description of presently preferred embodiments when taken in conjunction with the accompanying drawings wherein.

DETAILED DESCRIPTION OF THE DRAWINGS

Figure 1:
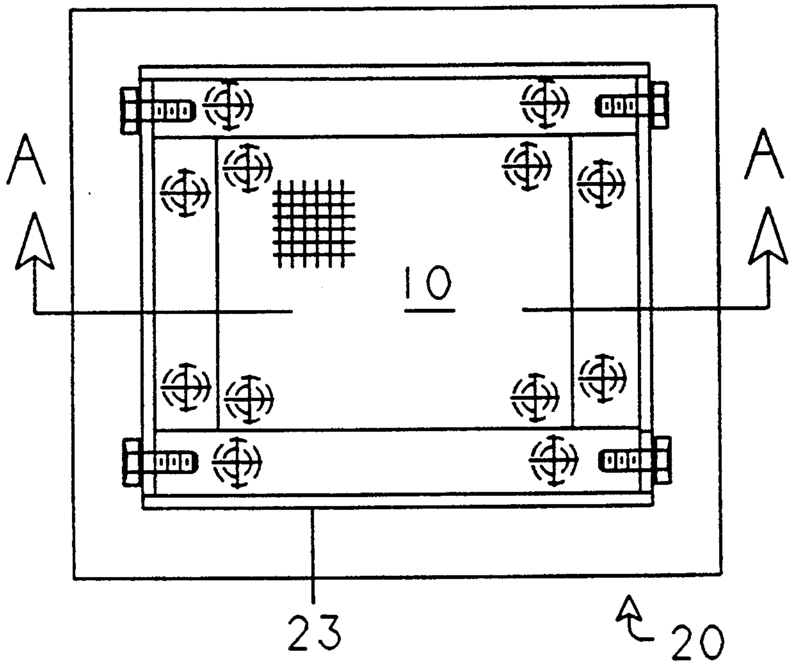
FIG. 1 is a plan schematic view of the silicone casting tool assembly which can also be used as an epoxy resin casting tool assembly.

FIGS. 3-7 show the overall tooling plate and the surface details of the tooling plate designated generally by the numeral 10 which are used to make the WAFFLELINE structure with an identical surface configuration except for the margins 11. The tooling plate 10 is machined from aluminum in the same manner that the conventional WAFFLELINE structure plates have been made. A margin 11 is used to restrain the metal workpiece during machining. The perimeter region or border 11 is also required during the casting process to be hereinafter described so that casting can be cut to size. It will be understood also that the surface of the tooling plate 10 must be free from all burrs and have an adequate surface finish. One known way of achieving such a surface finish is to bead blast the surface using glass beads. The tooling plate also has a thickness of about 1.75 inches.

Further details regarding the tooling plate surface features, as shown in FIGS. 4–7, will not be described in detail since their general geometry is generally well understood as is the purpose of such geometry. Generally speaking, the tooling plate has a matrix identical to the finished WAFFLELINE structure with a pattern of mesas 12 and channels 13 (FIGS. 6 and 7) running in a first direction and in a second direction transverse to the first direction. The WAFFLELINE structure will also have rectangular depressions 14 (FIGS. 4 and 5) for mounting electronic modules. The tooling plate 10 is mounted in connection with a silicone casting tool assembly shown schematically in FIGS. 1 and 2 and designated generally by the numeral 20. The tool assembly 20 upon which the tooling plate 10 is secured by screws 21 or the like includes a bottom cover 22, side rails 23 defining a mold cavity around the perimeter of the tooling plate 10 and a planar top cover (not shown) similar to the bottom cover 22 to close off the mold cavity after pouring of the casting mixture. As a preliminary matter, the tool assembly is cleaned thoroughly with alcohol. To prevent the casting mixture from corrupting any fastener holes, pins and the like, such holes and pins are masked off with tape or plugged with wax. The side rails 23 are erected around the tooling plate 10 and, if desired, a potting dam can be made around the top edge of the side rails 23 by using tape to allow rising of the silicone.

The entire assembly is installed in a known type of evacuation chamber (not shown) inside a vacuum bag which has been lined with a non-stick or disposable film to catch the excess casting fluid and to prevent the tools from the sticking to the chamber following cure. The casting tool assembly 20 is levelled inside the evacuation chamber.

Batches of silicone rubber are mixed in an amount which is approximately twice the volume of the actual casting. For example, a typical recipe will be 100 parts by weight silicon RTV E base, 10 parts by weight silicone catalyst, and 5 parts by weight DC 200. The silicone will start to set up approximately 1½ to 2 hours after the catalyst has been added. The constituents are mixed until a uniform color and texture have been achieved. In an illustrative application which is not to be taken as limitative of the present inventions, the approximate casting volume can be about 1,380 cubic inches, the silicone density is 0.04 pounds per inch cube and the approximate casting weight is 55.2 pounds.

The casting mixture is now cast into the tool assembly 20 to fill the container up to the top of the side rails 23. The silicone may rise up into the tape potting dam area during deairing. The vacuum chamber is now sealed off and an intermittent vacuum is applied to agitate and partially deair the casting mixture. Once the mixture appears to bubble mildly without significant frothing, a continuous vacuum (e.g., 0.5–2.5 mmHg) for approximately 10 minutes is applied to remove the remaining air from the casting mixture. If, during the evacuation process, the casting mixture bubbles away from the tooling plate surface in local areas, an appropriate tool is used to wick the mixture into each waffle cell individually.

Figure 8:
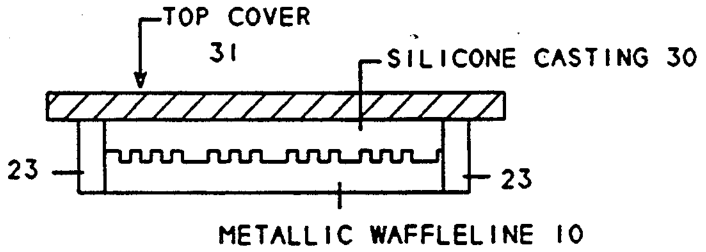
FIGS. 8-13 are diagrammatic cross-sectional views of a casting tool assembly and flexible waffleline structure formed thereby at respective stages of its manufacture.

The evacuation chamber is reopened and the tank potting dam is removed to allow the excess silicone casting mixture 30 to run off. As shown in FIG. 8, a top cover 31 is now installed on side rails 23 and lowered into position slowly forcing a resin wave across the top surface of the casting chamber. The top cover 31 is fastened to the side rails 23 by screws or the like with the screws being slowly tightened to force out all excess casting fluid. During this slow tightening, the top cover 31 is restrained from sliding and thereby agitating the casting fluid. The silicone casting mixture 30 is then cured at room or non-elevated temperature for a minimum of 24 hours. In this connection, we have found it desirable not to use elevated cure temperatures because silicone has a high coefficient of thermal expansion and will distort with elevated temperature cures.

Figure 9:
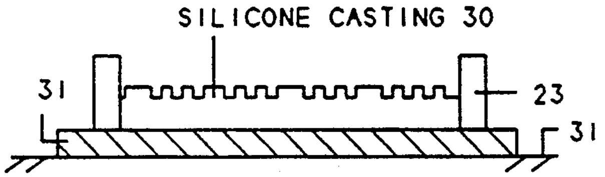

Next, as shown in FIG. 9, the silicone fixture assembly is removed from the evacuation chamber and is placed onto a flat surface 35 where the assembly 20 is rotated (or inverted) so that the side rails 23 can be removed and the tooling plate 10 separated from the silicone casting 30. The silicone casting 30 and tooling plate 10 are carefully separated using a peeling technique as may be permitted and, if necessary, applying some compressed air to aid in separation.

Figure 2:
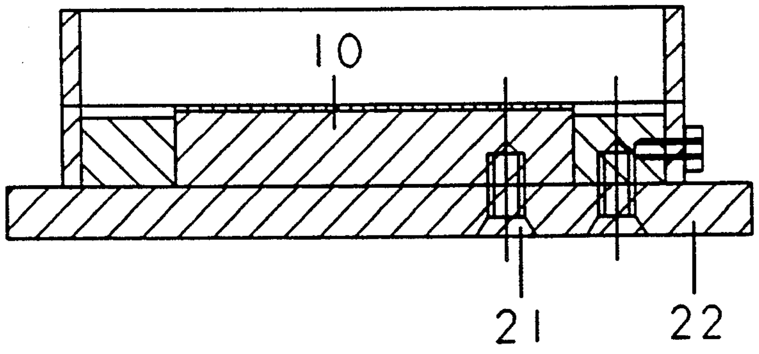
FIG. 2 is an elevational cross sectional view taken along line A—A of FIG. 1.
Figure 3:
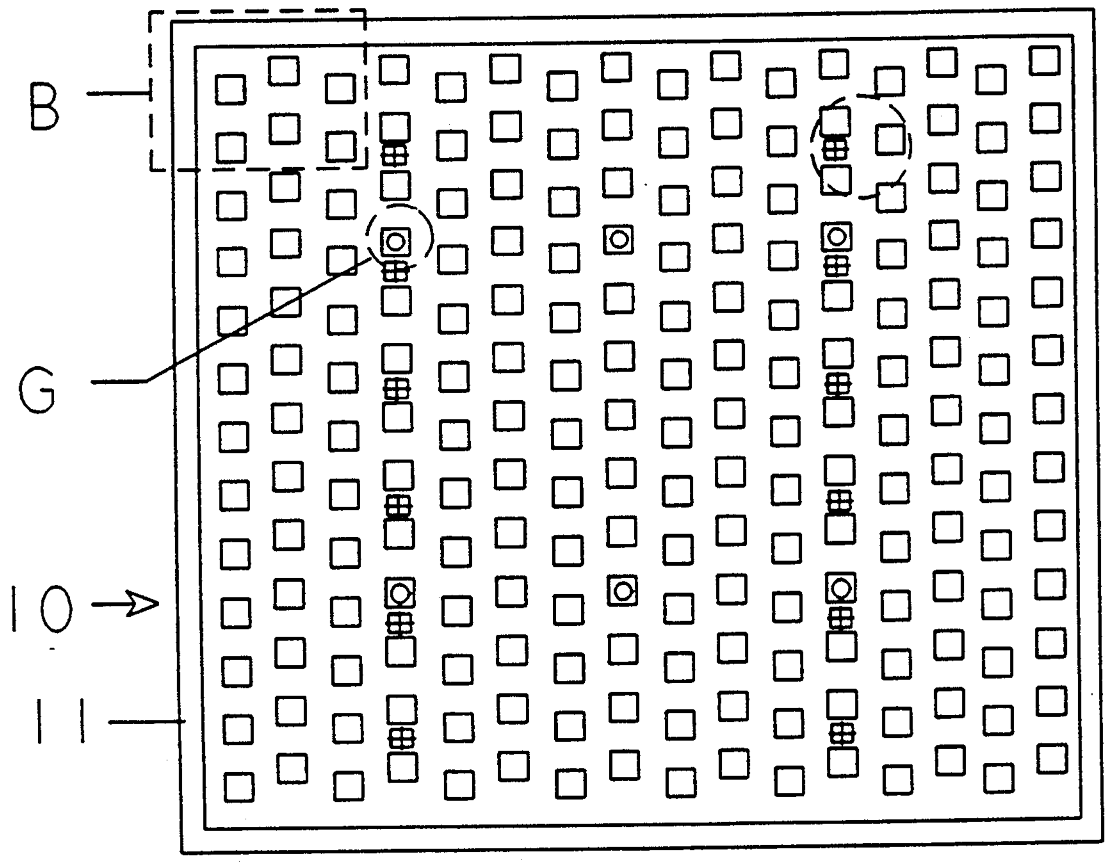
FIG. 3 is a plan view of the WAFFLELINE tooling plate used in the mold assembly of FIG. 1 with only a portion of the WAFFLELINE structure grid pattern of mesas and channels.
Figure 4:
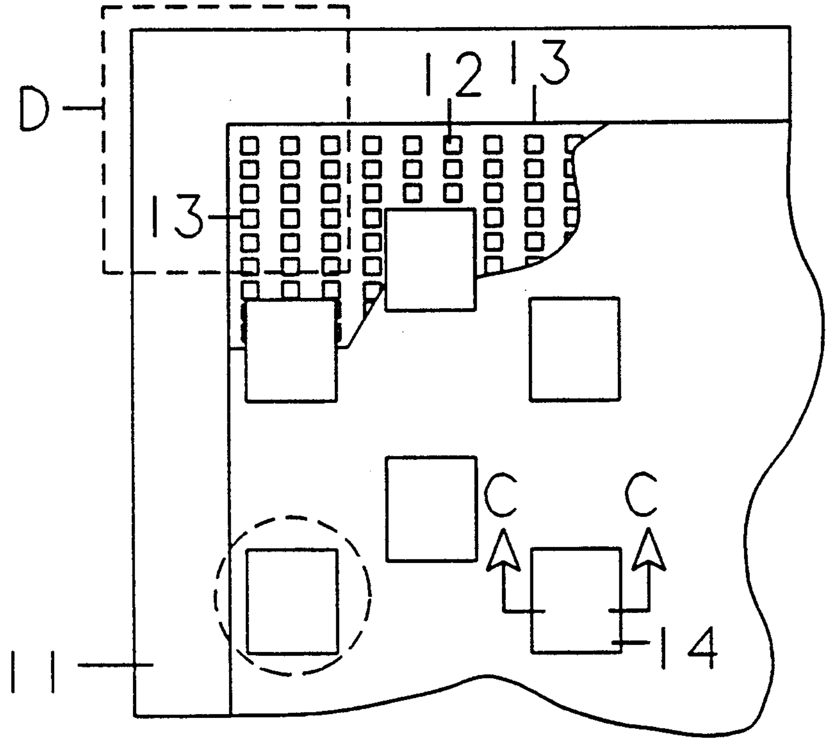
FIG. 4 is an enlargement of detail B contained within the dashed lines in FIG. 3.
Figure 5:
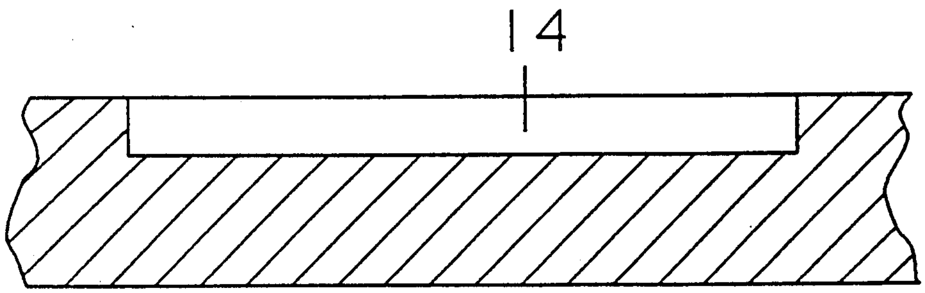
FIG. 5 is a cross-sectional elevation view taken along line C—C in FIG. 4.
Figure 6:
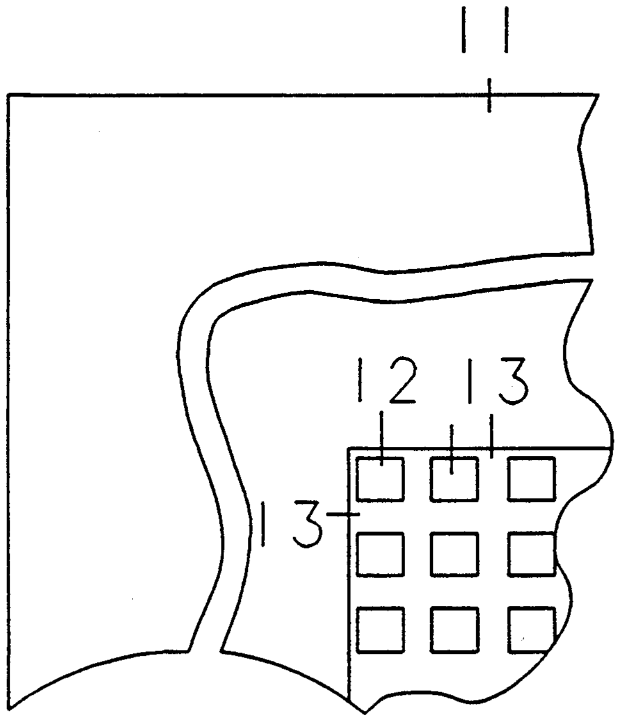
FIG. 6 is further enlargement within the area shown in dashed lines designated by the letter D in FIG. 4 (which is itself the enlarged area B of FIG. 3) showing the mesa and channel structure and a margin on the tooling plate which is not present in the finished WAFFLELINE structure.
Figure 7:
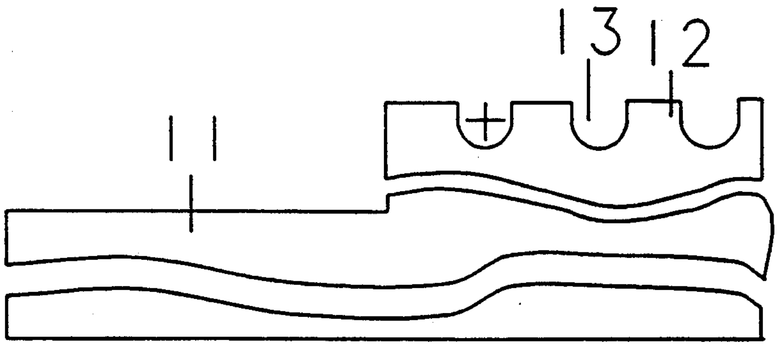
FIG. 7 is an elevational view of the enlarged section shown in FIG. 6.

The silicone casting 30 which is a virtually identical negative to the matrix of the aluminum tooling plate 10, is now placed in a tool assembly similar to the assembly shown in FIGS. 1 and 2. The inner edge of the side rails and a top cover as well as any other metallic surfaces exposed to the casting mixture are coated with a mold release agent. It is important, however, that no mold release or other agents be applied to the silicone casting itself in order to prevent contamination. Again, to prevent the casting mixture 30 from corrupting threads, pins and the like, such parts can be masked off with a Teflon tape. A casting dam is again made around the perimeter of the side rails 23 and extends, for example, about 5 to 6 inches above the top of the side rails to allow the epoxy resin casting mixture to rise.

Figure 10:
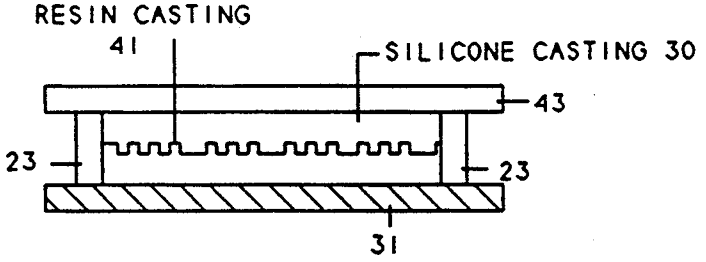

The tooling assembly is now installed so as to be level in the evacuation chamber. The vacuum chamber is closed off and a preliminary vacuum is pulled to evaluate the stability of the silicone casting during the deairing and to verify that the silicone casting does not rise. If the evaluation is satisfactory, the evacuation chamber is reopened, and the tape dams are removed. Next, as shown in FIG. 10, an epoxy resin casting mixture 41 is then poured into the mold cavity up to the side rails 23. If desired, a glass cloth (not shown) can be now placed over the casting assembly in a flat and wrinkle-free manner. The glass cloth reinforces the finished WAFFLELINE structure and a thin layer of deaired epoxy is poured onto the top cover to precoat it. A top 43 is then lifted and installed onto the side rails 23. During the installation, glass cloth should not slip. A vacuum bag is closed around the fixture and a vacuum is pulled to force the excess casting mixture out of the mold chamber. A vacuum pressure is maintained during cure which lasts for about 15 hours at non-elevated cure temperatures.

Figure 11:
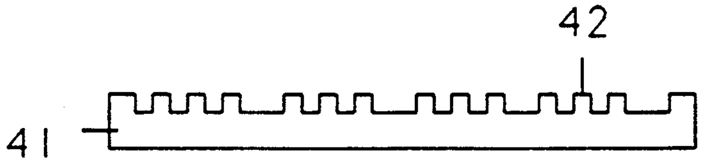

After the curing is complete, the top cover 43 is removed and the side rails 23 are disassembled. Again, a peel technique is used to separate the epoxy casting from the silicone mold. If necessary, shop air is applied to the silicone-epoxy interface to aid in separation. The resulting casting shown in FIG. 11, is laid flat on a table and cleaned carefully with dry air. It is inspected to identify any malformed or missing mesas in the WAFFLELINE structure geometry. A severely warped casting can be corrected by placing the casting between two flat plates in an oven at about 200° F. for about 1 hour to postcure the epoxy. The assembly can be left in the oven until the oven temperature returns to ambient temperature.

The epoxy formulation used for the casting mixture can be, for example, 100 parts by weight Hysol EA 956 part A, 58 parts by weight Hysol EA 956 part B and 6 parts by weight Carbospheres type C in an amount which is approximately six times the volume of the casting. Excess epoxy has been found to result in less skreeding and better deairing. An extra container of epoxy (about 0.5 to 0.75 pounds) should be deaired so that it can be used to precoat the top cover. The vacuum chamber is sealed off and an intermittent vacuum applied to agitate and deair the mixture. Once the mixture appears to bubble mildly without significant frothing, a continuous vacuum is applied and the chamber is thereafter reopened to access the casting.

Figure 12:
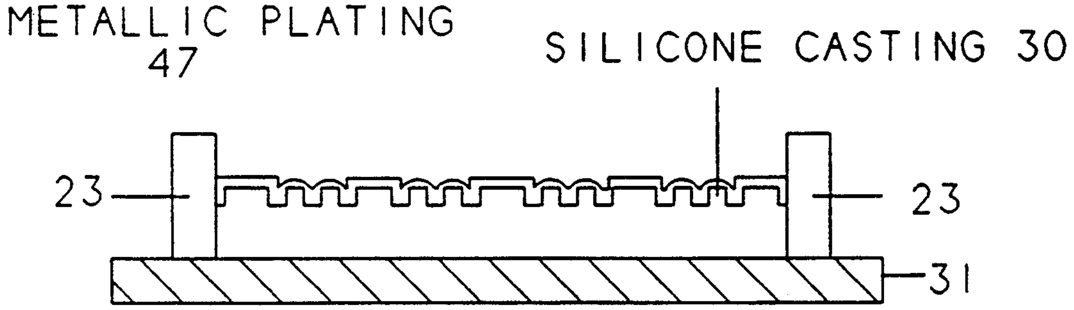
Figure 13:
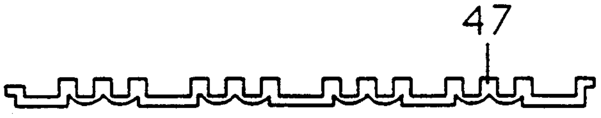

Instead of the epoxy composite WAFFLELINE structure, the negative WAFFLELINE structure silicone rubber casting 30, of FIG. 9, can be utilized to electroform a nickel WAFFLELINE structure in a conventional manner. If the nickel is to be electroformed, the silicone is first made electrically conductive with a silver spray. As shown in FIG. 12, a layer of nickel 47 is then electroformed on the silver-spayed negative waffleline casting 30. After the nickel layer 47 has been electroformed onto the silicone mold 30 in a conventional manner, a peel technique is used to separate the silicone mold from the electroformed nickel layer 47, yielding the flexible nickel waffleline structure 47 of FIG. 13. As shown therein, one side of the flexible metal waffleline structure provides the intended transmission line configuration, while the second side, which is generally parallel with the first side, has a shape that is effectively complementary to the shape of the flexible conductive transmission line structure. The silicone is much more flexible than the electroform 47 and should therefore be peeled from the electroform, not vice versa. Shop air can be applied to the silicone-electroform interface to aid in separation. The nickel electroform 47 is then metallized with gold by an electrodip or an ion beam implantation.

The positive epoxy casting 41 of FIG. 11 is also metallized with gold to form a flexible conductive waffleline structure. The epoxy casting is treated as if it were a plastic and is subjected, prior to metallization, to an activation process which includes dipping and abrasion. An atomic layer of palladium chloride and then a layer of copper are applied in activation.

By way of specific example, the epoxy composite WAFFLELINE structure 41 of FIG. 11 structure is cleaned and rinsed. Both sides are vapor blasted. The positive is then rinsed and deionized at room temperature and dried thoroughly with air. Thereafter, it is immersed in 40% $HNO_3$ for a period of time at room temperature, thereafter vapor blasted and then again immersed in the $HNO_3$ and then rinsed in the ionized water in room temperature. After further cleaning, rinsing and immersing in conditioner, the positive casting is immersed in 40–50% solution HCl, then immersed in an activator such as Enthone #444 at room temperature with agitation to deposit an atomic layer of palladium. Thereafter the part is rinsed and deionized water at room temperature and immersed in a 5% solution of accelerator (Shipley #19). The casting is again rinsed in deionized water and immersed in an electrolysis copper solution for 30 minutes with agitation. Thereafter it is rinsed with deionized water at room temperature and immersed 5 to 10% of sulfuric acid $H_2SO_4$ at room temperature. It is rinsed in deionized water at room temperature and put in an electrolytic copper bath for three minutes (e.g., 33 amp current) at room temperature. The part is then rinsed in room temperature deionized water for one to two minutes, again rinsed with sulfuric acid, and thereafter immersed in nickel with a current of about 20 to 25 amps. After deposition of the nickel, the positive is rinsed in room-temperature deionized water and thereafter placed in electrolytic gold for 50 minutes at a current of 6 amps with the part being rotated every five minutes in the electrolytic tank to induce uniform plating thickness of a metallized surface 42. After the electrolytic process, the flexible metallized resin casting part of FIG. 11 part is rinsed in room-temperature deionized water and air dried.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A flexible transmission line structure for providing signal transmissions between spaced apart circuit components comprising a flexible member that is conformable with a non-flat surface, one side of said flexible member having a first plurality of regularly-spaced, parallel conductive channels extending in a first direction, and a second plurality of regularly-spaced, parallel conductive channels extending in a second direction transverse to said first direction, so as to form, with said first plurality of conductive channels, a waffle-iron-like arrangement of conductive mesa portions each of which extends from a commonly-shared conductive floor for each of said conductive channels to a prescribed height above said conductive floor, the commonly-shared conductive floor, conductive side walls of said conductive channels defined by conductive side walls of said conductive mesa portions, and top land portions of said mesas comprising conductive material and at least one circuit component receiving portion for accommodating at least one circuit component, so that said waffle-iron-like arrangement of mesa portions may provide, together, with signal conductors for connection to said at least one circuit component and disposed in said channels of said first and second pluralities of regularly-spaced conductive parallel channels, a flexible conductive transmission line structure that is periodic in both of said first and second directions.

2. A flexible transmission line structure according to claim 1, wherein the separation between adjacent conductive channels as defined by the width of a conductive mesa portion therebetween is greater than the width of a conductive channel.

3. A flexible transmission line structure according to claim 1, wherein an individual one of said conductive mesa portions has a substantially rectangular-solid shape.

4. A flexible transmission line structure according to claim 1, wherein the side walls of said conductive mesas are curvilinear at their intersection with the commonly-shaped floor for said conductive channels.

5. A flexible transmission line structure according to claim 1, wherein said at least one circuit component receiving portion comprises a plurality of depressions distributed among said conductive mesas and disposed in said flexible member extending form said floor to a prescribed depth in said flexible member.

6. A flexible transmission line structure according to claim 1, wherein said flexible member comprises a flexible non-metallic material, said one side is which is metallized to provide said flexible conductive transmission line structure.

7. A flexible transmission line structure according to claim 6, wherein said flexible non-metallic material comprises an epoxy composite material.

8. A flexible transmission line structure according to claim 6, wherein said one side of said flexible non-metallic material is metallized with multiple layers of metal.

9. A flexible transmission line structure according to claim 1, wherein the entirety of said flexible member is comprised of a thin flexible metal structure, one side is which provides said flexible conductive transmission line structure, and a second side of which is generally parallel with and has a shape that is effectively complementary to the shape of said flexible conductive transmission line structure on said one side thereof.

10. A flexible transmission line structure according to claim 9, wherein the thin flexible metal structure of said flexible member is comprised of a multiple layers of metal.

11. A flexible transmission line structure comprising a flexible member that is flexible so that it may conform with a non-flat surface, one side of said flexible member having in a first surface thereof a first plurality of regularly-spaced, parallel conductive channels extending in a first direction, and a second plurality of regularly-spaced, parallel conductive channels extending in a second direction transverse to said first direction, so as to form, with said first plurality of conductive channels, a flexible waffle-iron-like arrangement of conductive mesa portions each of which extends from a commonly shared conductive floor for each of said conductive channels to a top land portion having a prescribed height above said commonly shared conductive floor, so that said flexible waffle-iron-like arrangement of conductive mesa portions forms with signal conductors disposed in said channels of said first and second pluralities of regularly-spaced parallel conductive channels, a transmission line structure that is periodic in both of said first and second directions.

12. A flexible transmission line structure according to claim 11, wherein an individual one of said conductive mesa portions has a substantially rectangular-solid shape.

13. A flexible transmission line structure according to claim 12, wherein side walls of said conductive mesas are curvilinear at their intersection with the commonly-shaped conductive floor for said channels.

14. A flexible transmission line structure according to claim 11, wherein said flexible member comprises a flexible non-metallic material, said one side is which is metallized to provide said flexible conductive transmission line structure.

15. A flexible transmission line structure according to claim 14, wherein said flexible non-metallic material comprises an epoxy composite material.

16. A flexible transmission line structure according to claim 14, wherein said one side of said flexible non-metallic material is metallized with multiple layers of metal.

17. A flexible transmission line structure according to claim 11, wherein the entirety of said flexible member is comprised of a thin flexible metal structure, one side is which provides said flexible conductive transmission line structure, and a second side of which is generally parallel with and has a shape that is effectively complementary to the shape of said flexible conductive transmission line structure on said one side thereof.

18. A flexible transmission line structure according to claim 17, wherein the thin flexible metal structure of said flexible member is comprised of a multiple layers of metal.

* * * * *